United States Patent Office 3,658,737
Patented Apr. 25, 1972

3,658,737
USE OF COAL IN ELECTRODEPOSITABLE
COMPOSITIONS
James Irwin, New Kensington, Pa., assignor to PPG
Industries, Inc., Pittsburgh, Pa.
No Drawing. Continuation-in-part of application Ser. No.
746,747, July 23, 1968, which is a continuation-in-part
of application Ser. No. 635,405, May 2, 1967. This
application June 23, 1969, Ser. No. 835,746
Int. Cl. B01k 5/02; C09d 5/24; C23b 13/00
U.S. Cl. 260—21
8 Claims

ABSTRACT OF THE DISCLOSURE

This invention relates to novel pigmented electrodepositable compositions. More particularly, this invention relates to the use of anthracite coal in pigmentary form to produce black, grey or dark-colored electrodepositable compositions.

CROSS-REFERENCES TO RELATED APPLICATIONS

This application is a continuation-in-part of copending application Ser. No. 746,747, filed July 23, 1968, now U.S. Pat. No. 3,493,482, issued Feb. 3, 1970, which in turn is a continuation-in-part of application Ser. No. 635,405, filed May 2, 1967, now abandoned.

STATE OF THE PRIOR ART

Recently, electrodeposition has been achieving wide industrial acceptance as a method of applying protective coatings. The coatings achieved have excellent properties for many applications and electrodeposition results in a coating which does not run or wash off during baking. Virtually any conductive substrate may be coated by electrodeposition. The most commonly employed substrates include the base metals such as iron, steel, aluminum, copper, zinc, brass, tin, nickel and chromium, as well as other metals and pretreated metals. Impregnated paper, or other substrates rendered conductive under the conditions employed, may also be coated.

Electrodeposition of certain materials, including waxes, natural and synthetic resins, have been known in the art for some time. Likewise, a recent U.S. Pat. No. 3,230,162, describes a method and compositions presently utilized in the field of automotive finishing and industrial coatings.

DESCRIPTION OF INVENTION

While electrodeposition is in many respects advantageous compared to ordinary application methods, problems have arisen in the fact that carbon black, universally-used black pigment, displays several undesirable characteristics in electrodeposition composition. While carbon black pigments successfully deposit in electrodeposition compositions at low voltages, at higher voltages (for example, above about 200 volts) a problem of "pig-skinning" is encountered. "Pig-skinning" may be defined as a rough, uneven surface as compared to the normal, desirable smooth surface obtained in a conventional paint formulation. The use of pulverulent coal, especially anthracite coal, produces a smoother surface under high voltage conditions than does the conventional carbon black. Further, from the appearance of the panels upon removal from the electrodeposition bath, it appears that there is less gas formation on the surface of the article being coated than when carbon black is employed. This likewise affects the character and appearance of the film deposited.

Yet another improvement over carbon black is the fact that the use of coal in pigmentary form provides better flow characteristics to the deposited film and there is apparently less creepage from edges so that, for example, salt spray performance of compositions containing coal in pigmentary form improve over those similar compositions containing carbon black pigment. The vehicle resin plays little part in producing this effect, and the improvement is seen in substituting coal in pigmentary form in virtually every electrodepositable composition.

The coals which may be utilized in the compositions of the invention comprise those coals generally referred to as anthractites and bituminous coals, including low volatile bituminous, medium volatile bituminous and high volatile bituminuous coals. These materials are defined in the Encyclopedia of Chemical Technology, Kirk and Othmer, volume IV, Interscience Publishers (1949), as well as ASTM–D388–38. The anthracite coals include meta-anthracite, anthracite and semi-anthracite. "Coals," as used throughout the specification and claims, is limited to those materials most commonly considered to be anthracite and bituminous coals.

A number of electrodepositable resins are known and can be employed to provide the electrodepositable composition of this invention. Virtually any water-soluble, water-dispersible, or water emulsifiable polycarboxylic, resinous material can be electrodeposited and, if film-forming, provides a coating which may be suitable for certain purposes. Any such electrodepositable is included among those which can be employed in the present invention, even though the coating obtained may not be entirely satisfactory for certain specialized uses.

A number of electrodepositable resins are known and can be employed to provide the electrodepositable compositions which may be treated by the process of this invention. Virtually any water-soluble, water-dispersible or water-emulsifiable polyacid or polybasic resinous material can be electrodeposited and, if film-forming, provides coatings which may be suitable for certain purposes. Any such electrodepositable composition is included among those which can be employed in the present invention, even though the coating obtained might not be entirely satisfactory for certain specialized uses.

Presently, the most widely used electrodeposition vehicle resins are synthetic polycarboxylic acid resinous materials which include a reaction product or adduct of the drying oil or semi-drying oil fatty acid ester with a dicarboxylic acid or anhydride. By drying oil or semi-drying oil fatty acid esters are meant esters of fatty acids which are or can be derived from drying oils or semi-drying oils, or from such sources as tall oil. Such fatty acids are characterized by containing at least a portion of polyunsaturated fatty acids. Preferably, the drying oil or semi-drying oil per se is employed. Generally, drying oils are those oils which have an iodine value of above about 130, and the semi-drying oils are those which have an iodine value of about 90 to 130, as determined by method ASTM–D1467–57T. Examples of such esters include linseed oil, soya oil, safflower oil, perilla oil, tung oil, oiticca oil, poppyseed oil, sunflower oil, tall oil esters, walnut oil, dehydrated castor oil, herring oil, menhadan oil, sardine oil, and the like.

Also included among such esters are those in which the esters themselves are modified with other acids, including saturated, unsaturated or aromatic acids such as butyric acid, stearic acid, linoleic acid, phthalic acid, isophthalic acid, terephthalic acid or benzoic acid, or an anhydride of such an acid. One inexpensive acid material which has been found to produce good results in many instances is rosin, which is composed of chiefly abiotic acid and other resin acids. The acid-modified esters are made by transesterification of the ester, as by forming a di- or monoglyceride by alcoholysis, followed by esterification with the acid. They may also be obtained by reacting oil acids with a polyol and reacting the acid with the partial ester. In addition to glycerol, alcoholysis can be carried out using other polyols such as trimethylolpropane, pentaerythritol, sorbitol and the like. If desired, the esters can also be modified with monomers such as cyclopentadiene or styrene and the modified esters produced thereby can be utilized herein. Similarly, other esters of unsaturated fatty acids, for example, those prepared by the esterification of tall oil fatty acids with polyols, are also useful.

Also included within the terms "drying oil fatty acid esters" as set forth herein are alkyd resins prepared utilizing semi-drying or drying oils; esters of epoxides with such fatty acids, including esters of diglycidyl ethers of polyhydric compounds as well as other mono-, di- and polyepoxides, semi-drying or drying oil fatty acid esters of polyols, such as butanediol, trimethylolethane, trimethylolpropane, trimethylolhexane, pentaerythritol, and the like; and semi-drying or drying fatty acid esters of resinous polyols such as homopolymers or copolymers of unsaturated aliphatic alcohols, e.g., allyl alcohol or methallyl alcohol, including copolymers of such alcohols with styrene or other ethylenically unsaturated monomers or with non-oil modified alkyd resins containing free hydroxyl groups.

Any alpha, beta-ethylenically unsaturated dicarboxylic acid or anhydride can be employed to produce the reaction products described herein. These include such anhydrides as maleic anhydride, itaconic anhydride, and other similar anhydrides. Instead of the anhydride, there may also be used ethylenically unsaturated dicarboxylic acids which form anhydrides, for example, maleic acid or itaconic acid. These acids appear to function by first forming the anhydride. Fumaric acid, which does not form an anhydride, may also be utilized, although in many instances it requires more stringent conditions than the unsaturated dicarboxylic acid anhydrides or acids which form such anhydrides. Mixtures of any of the above acids or anhydrides may also be utilized. Generally speaking, the anhydride or acid employed contains from 4 to 12 carbon atoms, although longer chain compounds can be used if so desired.

While the exact nature of the reaction product of the acid or anhydride with the fatty acid ester is not known with certainty, it is believed that the reaction takes place by addition of the unsaturated linkage of the acid or anhydride to the carbon chain of the oil. In the case of non-conjugated double bonds, such as are present in linseed oil, the reaction may take place with the methylene group adjacent the non-conjugated double bonds, such as tung oil, the reaction is probably of the Diels-Alder type.

The reaction between the acid or acid anhydride and the drying oil or semi-drying oil fatty acid ester takes place readily without the use of a catalyst and at temperatures in the range of about 100° C. to about 300° C. or higher, with the reaction generally being carried out between about 200° C. and about 250° C.

While the reaction products can be comprised solely of adducts of the fatty acid ester and the dicarboxylic acid or anhydride, in many instances it is desirable to incorporate into the reaction product another ethylenically unsaturated monomer. The use of such monomer often produces films and coatings which are harder and more resistant to abrasion and which may have other similar desirable characteristics. For this purpose, any ethylenically unsaturated monomer can be employed. Examples of such monomers include monoolefinic and diolefinic hydrocarbons such as styrene, alpha-methyl styrene, alpha-butyl styrene, vinyl toluene, butadiene-1,3-isoprene and the like; halogenated monoolefinic and diolefinic hydrocarbons, such as alpha-chlorostyrene, alpha-bromostyrene, chlorobutadiene and similar compounds; esters of organic and inorganic acids, such as vinyl acetate, vinyl propionate, vinyl 2-chlorobenzoate, methyl acrylate, ethyl methacrylate, butyl methacrylate, heptyl acrylate, decyl methacrylate, methyl crotonate, isopropenyl acetate, vinyl alpha-bromopropionate, vinyl alpha-chlorovalerate, allyl chloride, allyl cyanide, allyl bromide, allyl acetate, dimethyl itaconate, dibutyl itaconate, ethyl alpha-chloroacrylate, isopropyl alpha-bromoacrylate, decyl alpha-chloroacrylate, dimethyl maleate, diethyl maleate, dimethyl fumarate, diethyl fumarate, and diethyl glutaconate; organic nitriles, such as acrylonitrile, methacrylonitrile, ethacrylonitrile and the like.

As is apparent from the above discussion and the examples set forth, which, of course, do not include all of the ethylenically unsaturated monomers which may be employed, any such monomer can be utilized. The preferred class of monomers can be described by the formula:

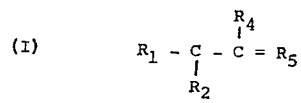

(I) $$R_1 - \underset{R_2}{\overset{R_4}{\underset{|}{\overset{|}{C}}}} - C = R_5$$

where $R_1$ and $R_2$ are hydrogen or alkyl, $R_4$ is hydrogen, alkyl or carboxyalkyl and $R_5$ is cyano, aryl, alkyl, alkenyl, aralkyl, alkaryl, alkoxycarbonyl or aryloxycarbony. The preferred compounds are styrene, substituted styrenes, alkyl acrylates, alkyl methacrylates, diolefins, and acrylonitrile.

The reaction of the fatty acid ester, the acid or anhydride or any additional monomer or monomers can be carried out concurrently, that is, with each of the components of the reaction product being mixed together and heated to reaction temperature. However, because the monomer and the acid or anhydride are often quite reactive with each other, the oil or other fatty acid ester is preferably first reacted with the acid or acid anhydride, and this product is subsequently reacted with any ethylenically unsaturated monomer or monomers employed. For example, a reaction product of linseed oil, maleic anhydride and styrene is made by first reacting maleic anhydride with linseed oil and then reacting the maleinized oil with styrene. When the process is carried out in this manner, the reaction of the additional monomer with the initial reaction product is usually carried out at somewhat lower temperatures, usually between about 25° C. and 200° C.

The proportions of each of the components going to make up the reaction product are ordinarily not crtical. Generally speaking, between about 10 percent and about 45 percent by weight of the unsaturated acid or acid anhydride is reacted with from about 55 percent to about 90 percent by weight of fatty acid ester. In the presently preferred products, usually 15 percent to 30 percent of anhydride and 70 percent to 85 percent of oil ester are employed. If an ethylenically unsaturated monomer is incorporated in the reaction product, it is typically used in amounts between about 5 percent and about 35 percent by weight, based upon the total weight of acid or anhydride and ester, with between 10 percent and 25 percent being used in those products preferred at present. Thus, in most instances the total composition of the reaction product may comprise from about 35 percent to about 90 percent by weight of the fatty acid ester and from about 10 percent to about 65 percent of the acid or anhydride and other monomer combined, with between about 6 and about 45 percent of the acid or anhydride always present.

The products produced in the above manner are comprised of polymeric chains of moderate length. The average molecular weight of the products to be used in electrodeposition should be low enough so that its flow characteristics at high solids are maintained, but high enough to provide adequate throwing power. The desirable molecular weight levels vary with the coating composition and conditions employed. Generally those products having molecular weights of up to 10,000 or somewhat higher have given the best results.

Neutralization of these products is accomplished by reaction of all or part of the dicarboxylic anhydride groups with a base, usually an amine. Usually up to about half of such groups are neutralized in unesterified adducts; the partially esterified products are often neutralized to a greater extent, based on unesterified acid groups remaining.

It is preferred in certain instances that the neutralization reaction be carried out in such a manner that amido groups are attached to part of the carbonyl carbon atoms derived from the dicarboxylic acid or anhydride. By amido groups are meant trivalent nitrogen atoms attached with one valence to the carbonyl carbon atom with the other two valences being linked to hydrogen or carbon atoms in the same or different organic radicals. Amido groups are formed, for example, when the reaction with the neutralizing base is carried out with a water solution of ammonia, a primary amine or a secondary amine, or when the product is reacted with such an amine in the absence of water.

Compositions within this general class are described in U.S. Pats. Nos. 3,366,563 and 3,369,983.

Another vehicle comprises the fatty acid ester, unsaturated acid or anhydride reaction products and any additional unsaturated modifying materials (as described above) which are further reacted with the polyol.

Essentially any polyol can be employed, but diols are preferred. When higher polyols, such as trimethylol propane, glycerol, pentaerythritol and the like are utilized, they are employed in small amounts, in conjunction with the diol, or in the presence of a monohydric alcohol, and are used with adducts having a relatively low proportion of acidic component. The various diols that can be employed include, for example, ethylene glycol; 1,2-propylene glycol; 1,4-butanediol; 1,5-pentanediol; 2-methyl-2-n-propyl-1,3-propanediol, and similar higher or substituted alkylene glycols, containing up to about 20 carbon atoms or more. Glycol ethers may also be employed, such as diethylene glycol, triethylene glycol, poly(oxytetramethylene)glycols, and the like, those having molecular weights of up to about 400 being most useful. Water-insoluble diols are often preferable, and especially desirable water-dispersed compositions for electrodeposition are obtained using 2,2-bis(4-hydroxycyclohexyl)propane (which has given the best results), neopentyl glycol, 1,1'-isopropylidene-bis(p-phenyleneoxy)di - 2 - propanol, and similar diols.

The proportions of polyol and ester-anhydride adduct that are employed depend upon various factors, but are, in general, limited only by the need to avoid gelation of the product. The total functionality of the reactants is a guide to determining the optimum proportions to be employed, and in most instances should not be greater than about 2. By "total functionality" is meant the total number of anhydride and hydroxyl groups divided by the total number of molecules of polyol and adduct. The numbers involved are, of course, average figures, and obviously many factors are taken into consideration in determining functionality, these being well-known in the art. When monomeric constituents are used, their functionality is relatively easily determined; but with resinous products such as the adducts herein, not only the proportion of anhydride in the adduct but also the bodying effect due to heating and similar considerations should be taken into account. In any event, one can easily determine whether any particular combination of reactants results in a gelled product, and as mentioned above, gelation can often be reversed by adding a monohydric alcohol.

In most instances, the reaction products herein are made from about 65 percent to about 98 percent of esteranhydride adduct and about 2 percent to about 35 percent of a diol, these percentages being by weight. However, it will be understood that depending upon the molecular weights of the reactants, varying amounts within these ranges or outside these ranges are employed with particular reaction systems.

In many instances, only part of the anhydride groups of the adduct, e.g., about 10 percent, are reacted with the polyol. Of those anhydride groups reacted, it is preferred that only one of the carboxyl groups is esterified in each instance. This is relatively easily accomplished because the half-ester of the dicarboxylic acid anhydride moieties present is preferentially obtained before the full ester begins to be formed. In addition, production of the full ester generally requires more stringent conditions, such as higher temperatures, even when an excess of hydroxyl groups is present. Thus, while it is not necessary that each anhydride form the half-ester and some of the dicarboxylic groups may be fully esterified, in actual practice the half-esters of the dicarboxylic acid moieties are usually obtained.

The reaction with the polyol is ordinarily carried out by admixing the initial reaction product of the fatty ester, the acid or anhydride, and any additional monomer with the polyol. The reaction at room temperature is quite slow, and thus it is preferred to heat the reaction mixture moderately, i.e., to about 80° C. or higher. The preferred maximum temperature is that at which the full ester begins to be formed, which varies with the particular polyol and which is in most cases about 180° C., but higher temperatures up to about 300° C. can be used if desired, for example, when the number of hydroxyl groups present does not exceed the number of anhydride groups present.

When the reaction is carried out as described, the product contains a substantial part of the original acidity derived from the dicarboxylic acid or anhydride; ordinarily the product should have an acid number of at least about 20. To provide a water-dispersed product, such as is used in electrodeposition processes, at least part of the remaining acidic groups are neutralized by reaction of the partially-esterified product with a base.

The polyol reaction products are more fully described in application Serial No. 450,205, now U.S. Pat. No. 3,565,781, issued February 23, 1971.

Another type of electrodepositable coating composition which gives desirable results are water-dispersible coating compositions comprising at least partially neutralized interpolymers of hydroxyalkyl esters of unsaturated carboxylic acids, unsaturated carboxylic acids and at least one other ethylenically unsaturated monomer. These are employed in the composition along with an amine-aldehyde condensation product, with the interpolymer usually making from about 50 percent to about 95 percent by weight of the resinous composition.

The acid monomer of the interpolymer is usually acrylic acid, but other ethylenically unsaturated monocarboxylic and dicarboxylic acids, such as ethacrylic acid, crotonic acid, maleic acid, or other acids of up to about 6 carbon atoms can also be employed. The hydroxyalkyl ester is usually hydroxyethyl or hydroxypropyl acrylate or methacrylate, but also desirable are the various hydroxyalkyl esters of the above acids having, for example, up to about 5 carbon atoms in the hydroxyalkyl radical.

Mono or diesters of the dicarboxylic acids mentioned are included. Ordinarily, the acid and ester each comprise between about one percent and about 20 percent by weight of the interpolymer, with the remainder being made up of one or more other copolymerizable ethylenically unsaturated monomers. The most often used are the alkyl acrylates, such as ethyl acrylate; the alkyl methacrylates, such as methyl methacrylate; and the vinyl aromatic hydrocarbons, such as styrene, but others can be utilized.

The above interpolymer is at least partially neutralized by reaction with a base as described above; at least about 10 percent and preferably 50 percent or more of the acidic groups are neutralized, and this can be carried out either before or after the incorporation of the interpolymer in the coating composition.

The amine-aldehyde condensation products included in these compositions are, for example, condensation products of melamine, benzoguanamine, or urea with formaldehyde, although other amine-containing amines and amides, including triazines, diazines, triazoles, guanadines, guanamines and alkyl and aryl-substituted derivatives of such compounds can be employed, as can other aldehydes, such as acetaldehyde. The alkylol groups of the products can be etherified by reaction with an alcohol, and the products utilized can be water-soluble or organic solvent-soluble.

Electrodeposition compoistions comprising the above interpolymers and an amine-aldehyde resin are more fully described in U.S. Pat. No. 3,403,088.

Still another electrodepositable composition of desirable properties comprises an alkyd-amine vehicle, that is, a vehicle containing an alkyd resin and an amine-aldehyde resin. A number of these are known in the art and may be employed. Preferred are water-dispersible alkyds such as those in which a conventional alkyd (such as a glyceryl phthalate resin), which may be modified with drying oil fatty acids, is made with a high acid number (e.g., 50 to 70) and solubilized with ammonia or an amine, or those in which a surface-active agent, such as a polyalkylene glycol (e.g., "Carbowax"), is incorporated. High acid number alkyds are also made by employing a tricarboxylic acid, such as trimellitic acid or anhydride, along with a polyol in making the alkyd.

The above alkyds are combined with an aminealdehyde resin, such as those described hereinabove. Preferred are water-soluble condensation products of melamine or a similar triazine with formaldehyde with subsequent reaction with an alkanol. An example of such a product is hexakis(methoxymethyl)melamine.

The alkyd-amine compositions are dispersed in water and they ordinarily contain from about 10 percent to about 50 percent by weight of amine resin based on the total resinous components.

Yet another electrodepositable composition of desirable properties comprises mixed esters of a resinous polyol. These resin esters comprise mixed esters of an unsaturated fatty acid adduct. Generally the polyols which are utilized with these resns are essentially any polyol having a molecular weight between about 500 and 5000. Such resinous polyols include those resinous materials containing oxirane rings which can be opened in, prior to, or during the esterification reaction to provide an apparent hydroxy site. The vehicle resins are formed by reacting a portion of the hydroxyl groups of the polyol with the fatty acid, the ratio of the reactions being such that at least an average of one hydroxyl group per molecule of the polyol remains unreacted. The remaining functionality is then reacted with the unsaturated fatty acid adduct of an olefinically unsaturated dicarboxylic anhydride, such as maleic anhydride, this second esterification reaction being conducted under conditions so that esterification occurs through the anhydride ring, thereby introducing free acid groups into the molecule. Mixed acids of the class described are disclosed in Belgian Pat. No. 641,642, as well as in copending application Ser. No. 568,144, filed July 27, 1966, now abandoned.

In order to produce an electrodepositable composition, it is necessary to at least partially neutralize the acid groups present with a base in order to disperse the resin in the electrodeposition bath. Inorganic bases such as metal hydroxides, especially potassium hydroxide, can be used. There may likewise be used ammonia or organic bases, especially water-soluble amines, such as, for example, the mono-, di- and tri-lower alkyl amines such as methylamine, ethylamine, propylamine, butylamine, dimethylamine, diethylamine, dipropylamine, dibutylamine, m-methyl-butylamine, triethylamine, tributylamine, methyldiethylamine, dimethylbutylamine, and the like; cyclic amines such as morpholine, pyrrolidine, piperidine; diamines such as hydrazine, methylhydrazine, 2,3-toluene diamine, ethyl diamine and piperazine and substituted amines such as hydroxylamine, ethanolamine, diethanolamine, butanolamine, hexanolamine and methyldiethanolamine, octanolamine, diglycolamine and other polyglycol amines, triethanolamine and methylethanolamine n-aminoethanolamine and methyldiethanolamine and polyamines such as diethylene triamine, triethylene tetramine, hexamethylene tetramine.

Other base-solubilized polyacids which may be employed as electrodeposition vehicles include those taught in U.S. Pat. No. 3,382,165, which is incorporated herein by reference, wherein the acid groups rather than being solely polycarboxylic acid groups contain mineral acid groups such as phosphonic, sulfonic, sulfate, and posphate groups.

The process of the instant invention is equally applicable to catonic type instant resins, that is, poly-bases solubilized by means of an acid, for example, an amine-terminated polyamide or an acrylic polymer solubilized with acetic acid. One such class of materials is described in British Pat. 1,132,267. Another case of such cationic polymers is described in copending application Ser. No. 772,366, filed Oct. 28, 1968.

In a manner similar to the anionic resins described above, the cationic resins may be formulated with adjuvants, such as pigments, solvents, surfactants, crosslinking resins, and the like.

The polyacids are anionic in nature and are dispersed or dissolved in water with alkaline materials such as amines or alkaline metal hydroxides and, when subjected to an electric current, they migrate to the anode. The polybasic resins, solubilized by acids, are cationic in character and when these resins are water dispersed or solubilized with an acid such as acetic acid, the material deposits on the cathode under an electric current.

The coal is introduced into the compositions of the invention in the same manner as conventional pigments are dispersed. Preferably, the coal is reduced to a small particle size, usually less than about 200 mesh and, preferably, below 10 microns before being added to the vehicle. If large particles of coal are introduced, the grinding will require more time and perhaps a filtration step to remove oversized particles remaining.

The coal is dispersed by grinding in the presence of at least a portion of the vehicle resin and, in most cases, a surfactant or dispersing agent, or in surfactant or dispersing agent with later addition of a vehicle resin. Grinding is accomplished by the use of ball mills, sand mills, Cowles dissolvers, continuous attritors, and the like, until the pigment has been reduced to the desired size and, preferably, has been wet by and dispersed in the vehicle resin and/or dispersing agent.

Preferably, the grinding is conducted in an aqueous dispersion of neutralized resin having a pH above about 7 and preferably about 9.0. The amount of water present in such an aqueous grind is not critical; however, commonly the resin employed in the grinding step is about 30 to about 70 percent solids. The use of water merely reduces the effective capacity of the mill and, while less water can be employed, the viscosity creates some problems in certain instances.

The pigment-binder ratio in the grinding step is not critical; however, levels between about 3.5:1 to 7:1 are frequently employed, although other levels may be utilized.

After grinding, the particle size should be in the range of 10 microns or less, preferably as small as practicable. Generally a Hegman grind gauge reading of about 6 is the minimum for a presently commercially acceptable composition.

For a general review of pigment grinding and paint formulation, reference may be had to: D. H. Parker, Principles of Surface Coating Technology, Interscience Publishers, New York (1965); R. L. Yates, Electropainting, Robert Draper Ltd., Teddington, England (1966); H. F. Payme, Organic Coating Technology, vol. II, Wiley & Sons, New York (1961).

In addition to the pigment of the invention, there may be present in the electrodepositable any of the conventional types of pigments employed in the art, for example, iron oxide, lead silico chromate, strontium chromate, carbon black, titanium dioxide, talc, barium sulfate, and the like, as well as combinations of these and similar pigments. Color pigments such as cadmium yellow, cadmium red, phthalocyanine blue, chrome yellow, toluidine red, hydrated iron oxide, and the like, may be included if desired. There is often incorporated into the pigment composition a dispersing or surface active agent. If such a surface active agent is used, it should be the non-ionic or anionic type or a combination of these types. It is desirable to avoid the use of any cationic type agent. Usually the pigment and surface active agent, if any, are ground together in a portion of the vehicle, or alone, to make a paste and this is blended with the vehicle to produce a coating composition.

It has been found especially important to regulate the ratio of pigment to the vehicle in compositions which are used in electrodeposition processes. In most instances the most desirable coatings are obtained when the coating composition contains a ratio of pigment-to-vehicle of not higher than 0.8:1 and preferably not higher than 2:1. If the composition has too high a pigment-to-vehicle ratio, the electro-deposited films may exhibit very poor flow characteristics, and in many instances are non-continuous and have poor film appearance.

In many instances, it is preferred to add to the bath in order to aid dispersibility, viscosity and/or film quality, a non-ionic modifier or solvent. Examples of such materials are aliphatic, naphthenic and aromatic hydrocarbons or mixtures of the same; mono- and dialkyl ethers of glycols, pine oil and other solvents compatible with the resin system. The presently preferred modifier is 4-methoxy-4-methylpentanone-2 (pent-oxone).

There may also be included in the coating composition, if desired, additives such as antioxidants. For example, orthoamylphenol or cresol. It is especially advantageous to include such antioxidants in coating compositions which are used in baths which may be exposed to atmospheric oxygen at elevated temperatures and with agitation over extended periods of time.

Other additives which may be included in coating compositions, if desired, include, for example, wetting agents such as petroleum sulfonates, sulfated fatty amines, or their amides, esters of sodium isothionates, alkyl phenoxypolyoxyethylene alkanols, or phosphate esters including ethoxylated alkylphenol phosphates. Other additives which may be employed include anti-foaming agents, suspending agents, bactericides, and the like.

In formulating the coating composition, ordinary tap water may be employed. However, such water may contain a relatively high level of metals and cations which, while not rendering the process inoperative, may result in variations of properties of the baths when used in electrodeposition. Thus, in common practice, deionized water, i.e., water from which free ions have been removed by the passage through ion exchange resins, is invariably used to make up coating compositions of the instant invention.

In addition to the electrodepositable vehicle resins described above, there may be present in the electrodepositable composition other resinous materials which are non-carboxylic acid materials. For example, there may be added up to about 50 percent by weight of an amine aldehyde condensation product. Examples of such amine aldehyde condensation products employed are aldehyde condensation products of melamine, urea, acetoguanamine or a similar compound, and may be water-soluble or organic solvent-soluble. Generally, the aldehyde employed is formaldehyde, although useful products can be made from other aldehydes such as acetaldehyde, crotonaldehyde, acrolein, benzaldehyde, furfural and others. Condensation products of melamine or urea are the most common and are preferred, but products of other amines and amides in which at least one amide group is present can be employed.

For example, such condensation products can be produced with triazines, diazines, triazoles, guanadines, guanamines, and alkyl- and aryl-substituted derivatives of such compounds, including alkyl-substituted and aryl-substituted cyclic ureas, and alkyl- and aryl-substituted melamines. Examples of such compounds are:

N,N'-dimethyl urea
Benzyl urea
N,N'-ethylene urea
Diazine diamide
Formaguanamine
Benzoguanamine
Ammeline
2-chloro-4,6-diamino-1,3,5-triazine
3,5-diaminotriazole
4,6-diaminopyrrimidine
2,4,6-triphenyltriamino-1,3,5-triazine
and the like These aldehyde condensation products contain methylol groups or similar alkylol groups, depending upon the particular aldehyde employed. If desired, these methylol groups can be etherified by reaction with an alcohol. Various alcohols are employed for this purpose, including essentially any monohydric alcohol, although the preferred alcohols are methanol, butanol, and similar lower alkanols. The amine aldehyde condensation products are produced in a manner well-known in the art, using acidic or basic catalysts and varying conditions of time and temperature. The aldehyde is often employed as a solution in water or alcohol, and the condensation, polymerization and etherification reactions may be carried out either sequentially or simultaneously.

In the electrodeposition process, a process well-described in the art, the aqueous bath containing the composition is placed in contact with an electrically-conductive anode, and an electrically-conductive cathode. The coating is deposited upon the anode so that the metal substrate to be coated is used as the anode. Upon passage of electric current (normally direct current) between the anode and the cathode while in contact with the bath containing current (normally direct current) between the anode the coating composition, an inherent film of the coating composition is deposited on the anode.

The conditions at which the electrodeposition process is carried out are those conventionally used in electrodeposition. The applied voltage may vary greatly and can be as low as, for example, one volt or as high, for example as 500 volts or higher. It is typically between 50 and 350 volts. The current tends to decrease during electrodeposition and the films become electrically insulative and cause the deposition of film to be self-terminating at any particular voltage.

The anode employed may be any electrically conductive metal, such as iron, steel, aluminum, galvanized steel, phosphatized steel, zinc, and the like.

The concentrations of the coating composition in the aqueous bath used in electrodeposition is not critical and relatively high levels of coating composition can be used; however, it is ordinarily desirable to use a low concentration of coating composition since this is one of the benefits inherent in the system. Baths containing as little as one percent by weight of the coating composition in water can be employed. In general practice, the baths used usually contain between 5 and about 15 percent by weight of paint solids. Generally, it is preferred not to use more than 20 or 25 percent by weight of the coating composition in the bath, although there is no technical reason why films cannot be produced in even higher levels. Once the film is deposited upon the substrate and the substrate removed from the bath, the article is treated as one which has been coated in the conventional painting operation. The article may be air-dried, or usually it is heated in an oven or by some other appropriate means to bake or dry the film. When this is done, the baking temperatures of about 275° F. to about 375° F. for 60 to 10 minutes are usually employed.

The invention is further described in conjunction with the following examples which are to be considered illustrative rather than limiting. All parts and percentages in the examples and throughout this specification are by weight unless otherwise stated.

EXAMPLE I

An electrodepositable composition was prepared as follows:

Into a steel ball mill were charged:

| | Parts by wt. |
|---|---|
| Deionized water | 200.0 |
| Dispersing agent (ethoxylated alkylphenol phosphate—Gafac PE-510) | 6.0 |
| China clay | 160.0 |
| Pulverized anthracite coal (less than 200 mesh—mesh—Carbo-O-Fil) | 110.0 |
|     Carbon—81.0% | |
|     Volatile matter—7.5% | |
|     Ash—11.0% | |
|     Sulfur—0.6% | |
|     Moisture—0.5% | |
|     Specific gravity—1.46 | |

The above mixture was ground for 30 minutes. This product was designated Paste A.

The following electrodepositable composition was formulated in the following order:

| | Parts by wt. |
|---|---|
| Acrylic vehicle resin | 115.0 |
|     Hydroxyethyl methacrylate—9.0% | |
|     Methacylic acid—5.0% | |
|     Styrene—27.5% | |
|     Ethyl acrylate—40.0% | |
|     2-ethylhexyl acrylate—18.5% | |
|     82% solids in 50/50 ethylene glycol monoethyl ether and aromatic petroleum distillate—Solvesso 150 | |
|     Gardner-Holdt viscosity—Z9–Z10 | |
|     Acid valve—25.0 | |
| Hexakis(methoxymethyl) melamine | 42.0 |
| Paste A (above) | 73.0 |
| Dimethylethanolamine | 6.5 |
| Deionized water | 1563.5 |

The above composition was electrocoated on phosphatized steel panels at 180 v. for one minute and then baked at 500° F. for two minutes. Coatings with good appearance were obtained.

EXAMPLE II

A similar electrodepositable composition was formulated, replacing Paste A with the following ground pigment paste:

| | Parts by wt. |
|---|---|
| Deionized water | 230.0 |
| Dispersing agent (ethoxylated alkylphenol phosphate) | 6.0 |
| Anthracite coal (as in Example I) | 3000.0 |

This electrodepositable composition was filtered and electrocoated in the same manner as Example I and yielded a coating which had good appearance. No gas bubbles were observed adhering to the surface of the panels as is the case when carbon blacks are employed.

EXAMPLE III

An electrodepositable composition was prepared as follows:

A pigment paste was made by griding the following to a Hegman No. 7 grind in a ball mill:

| | Parts by wt. |
|---|---|
| Resin B: | |
|     97.56%—20% maleinized linseed oil; 1.46%—diethylamine; 0.98%—cresylic acid; Acid value 90; 52,000 centipoises | 868 |
| Diethylamine | 174 |
| Mix well—add: | |
| Deionized water | 3200 |
| Dispersing agent (combination oil-soluble sulfonate an non-ionic surfactant—Witco 912) | 94 |
| Pulverized bituminous coal (less than 325 mesh—Austin Black) | 1720 |
|     Carbon—77% | |
|     Volatile matter—17.0% | |
|     Ash—5.0% | |
|     Sulfur—.03% | |
|     Moisture—1.0% max. | |
|     Specific gravity—1.22 | |
|     Oil absorption—40 lb. per 100 lbs. | |

To 200 parts of this pigment paste were added 700 parts of the following mixture.

| | Parts by wt. |
|---|---|
| Resin C: | |
|     97.0%—20% maleinized linseed oil; 3.0%—cresylic acid; acid value 90; 52,000 centipoises | 292 |
| Diethylamine | 28 |

Mix 45 minutes—add slowly:

| | Parts by wt. |
|---|---|
| Deionized water | 511 |
| Dispersing agent (combination oil-soluble sulfonate and non-ionic surfactant—Witco 912) | 1 |

This total composition was then reduced to 9.0 percent solids with deionized water and electrocoated on phosphatized steel panels at 50–120 volts. 0.1 mil films showed excellent appearance.

Various other electrodepositable compositions such as those hereinabove described can be substituted for those of the examples. In the above and other tests, the general applicability of the composition and methods herein have been shown and it has been found that good results are attained using varying compositions, electrodeposition conditions and substrates.

According to the provisions of the patent statutes, there are described above the invention and what are now considered its best embodiments; however, within the scope of the appended claims, it is to be understood that the invention can be practiced otherwise than is specifically described.

What is claimed is:

1. An aqueous electrodepositable composition comprising an ionically solubilized electrodepositable synthetic organic vehicle resin having dispersed therein coal in pigmentary form.

2. A composition as in claim 1 wherein the pigment-binder ratio is below about 1 to 1.

3. A composition as in claim 1 wherein the coal is an anthracite coal.

4. A composition as in claim 3 wherein the pigment-binder ratio is below about 1 to 1.

5. An aqueous composition as in claim 1 wherein the resin is a base-solubilized synthetic polycarboxylic acid resin.

6. A composition as in claim 5 wherein the pigment-binder ratio is below about 1 to 1.

7. A composition as in claim 5 wherein the coal is an anthracite coal.

8. A composition as in claim 7 wherein the pigment-binder ratio is below about 1 to 1.

References Cited

UNITED STATES PATENTS

| | | | |
|---|---|---|---|
| 3,362,899 | 1/1968 | Gilchrist | 204—181 |
| 3,385,802 | 5/1968 | Trieschock | 260—2.5 |

OTHER REFERENCES

Rybak et al., Chemical Abstracts, volume 66, 1967, page 38, 610Z (an abstract of East German Pat. No. 50796 issued Oct. 5, 1966).

DONALD E. CZAJA, Primary Examiner

R. W. GRIFFIN, Assistant Examiner

U.S. Cl. X.R.

117—132 R, 161 R, 161 K; 260—18 R, 22 CQ, 29.2 E, 29.2 R, 29.4 UA, 29.6 TA, 39 R, 40 R, 41 C